United States Patent [19]

Mallison

[11] Patent Number: 5,291,776
[45] Date of Patent: Mar. 8, 1994

[54] TIRE INFLATION REGULATOR FOR TIRE UNIFORMITY MACHINE

[75] Inventor: Frank K. Mallison, Akron, Ohio

[73] Assignee: Akron Special Machinery, Akron, Ohio

[21] Appl. No.: 867,442

[22] Filed: Apr. 13, 1992

[51] Int. Cl.$^5$ .............................................. G01M 17/02
[52] U.S. Cl. ...................................... 73/146; 132/224; 152/415
[58] Field of Search .................. 73/146; 137/224, 227, 137/229; 152/415

[56] References Cited

U.S. PATENT DOCUMENTS

| | | | |
|---|---|---|---|
| 3,720,207 | 3/1973 | Matheny et al. | 152/415 |
| 4,404,849 | 9/1983 | Iwama et al. | 73/146 |
| 4,852,398 | 8/1989 | Cargould et al. | 73/146 |
| 4,872,492 | 10/1989 | McAnally et al. | 152/415 |
| 5,029,467 | 7/1991 | Cargould | 73/146 |

OTHER PUBLICATIONS

*Bellofram Motorized Type 10 Pressure Regulator*, The Bellofram Corporation of Burlington, Mass. and Newell, W. Va., date unknown.

*Primary Examiner*—Donald O. Woodiel
*Attorney, Agent, or Firm*—Reese Taylor

[57] ABSTRACT

A control system for controlling air pressure to a tire during the testing cycle of a tire uniformity machine includes a mechanical regulator connected to a source of air and a transducer disposed adjacent the tire and in communication with a central processing unit and the regulator to match sensed variations with predetermined testing pressure programmed into the central processing unit and activate the regulator as required.

3 Claims, 3 Drawing Sheets

TIRE INFLATION REGULATOR FOR TIRE UNIFORMITY MACHINE

BACKGROUND OF THE INVENTION

This invention relates in general to tire uniformity machines and more particularly relates to a regulating system for controlling tire pressure during the testing cycle conducted on such machines.

DESCRIPTION OF THE PRIOR ART

Tire uniformity machines are well-known in the tire production and inspection art. Examples can be seen in Cargould U.S. Pat. Nos. 4,852,398 and 5,029,467.

The function of these machines is also well-known in the art and, essentially, they are intended to measure run out and radial and lateral force variations in tires, thereby ensuring a uniform, finished product. In practice, these machines are currently used in a more or less continuous fashion to test all vehicle tires manufactured during the production cycle and improve quality control.

The machines, in general, include upper and lower chucks between which the tires to be tested are inserted, with the lower chuck being connected to a hydraulically-operated piston and cylinder arrangement which raises and lowers the lower chuck so that the tire being tested may be clamped between the upper and lower chucks during the testing process.

These machines also conventionally employ a conveyor for delivering tires to be tested to a position between the upper and lower chucks when the chucks are open and to position the tire over the lower chuck prior to elevation of the lower chuck and clamping and testing of the tire. The conveyor, of course, is also employed to convey tested tires away from the uniformity machine following the testing cycle.

Furthermore, conventionally, means for inflating the tire, once the beads of the tire are seated on the chucks and the chucks have been brought together or closed, are provided. Once this has occurred and the tire has been inflated to the predetermined testing pressure, a laterally positioned loadwheel is moved radially inwardly into engagement with the tire.

Means for driving or rotating the upper chuck and the tire during the testing operation are also commonly provided.

It is, of course, desirable to maintain the proper pneumatic pressure within the tire during the testing cycle to insure accurate test results. In the prior art, this is generally accomplished by electronically monitoring the test pressure and manually regulating or changing the pressure in response to variations encountered therein. However, inasmuch as the distance from the tire to the regulator affects response time, and inasmuch as the tire pressure varies during its revolution under load from the loadwheel, it is difficult to obtain precise regulation. Because the distance from the tire to the regulator affects the response time, and because the tire pressure does vary, it is thus not always possible to obtain the desired precision.

Accordingly, it is thought desirable to improve upon the existing art by providing automatic, computer controlled tire inflation pressure.

SUMMARY OF THE INVENTION

It is, accordingly, a principal object of this invention to permit automatic, computer-controlled varying of precise tire pressure by positioning the regulator in close proximity to the tire to thereby achieve rapid and precise responses to variations in tire pressure.

In accordance with this object, it has been found that utilization of a servo-controlled pressure regulator driven by a synchronous motor until a balance between a set pilot pressure and the output pressure is achieved permits this object to be achieved.

Therefore, production of an improved tire uniformity machine inflation regulating system of the type above-described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
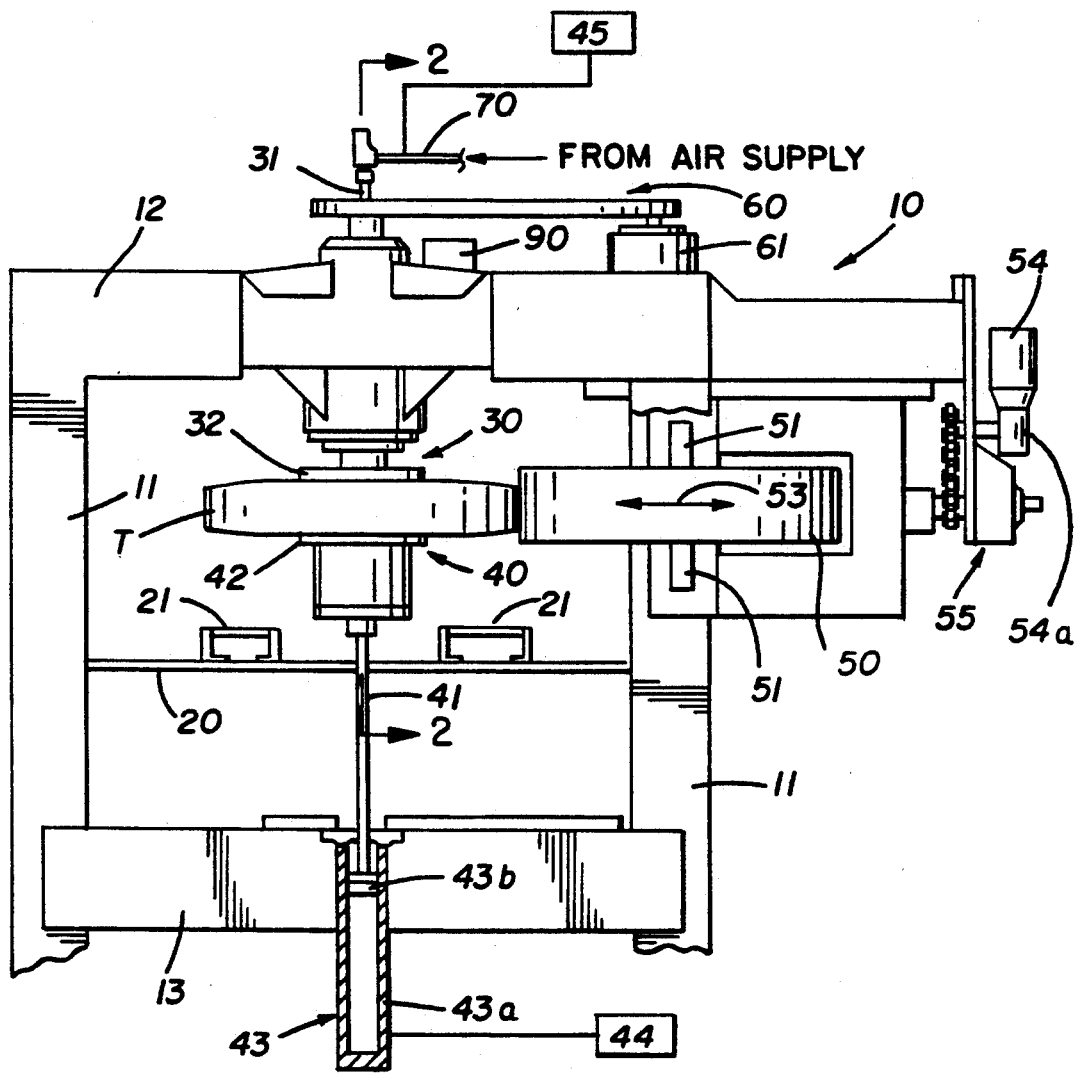
FIG. 1 is an elevational view, partially schematic, showing a conventional tire uniformity machine.

Referring first to FIG. 1 of the drawings which depicts a tire uniformity machine somewhat schematically, it will be seen that the tire uniformity machine, generally indicated by the numeral 10, includes a framework which essentially includes vertical frame members 11, 11, a top frame 12, and a bottom frame 13, with the usual construction being such that these members 11, 12 and 13 form an open cube or box-like framework for support of the remaining components of the apparatus.

The framework thus formed supports a horizontally disposed conveyor 20 which includes a plurality of rollers 21, 21 so that the tire T can be brought into the interior of the framework, transferred to the lower chuck assembly 40, raised, tested and then lowered and removed from the interior of the framework. Such conveyors are, of course, old and well-known to those skilled in this art and enable the machine to be operated on an essentially continuous basis.

Figure 2:
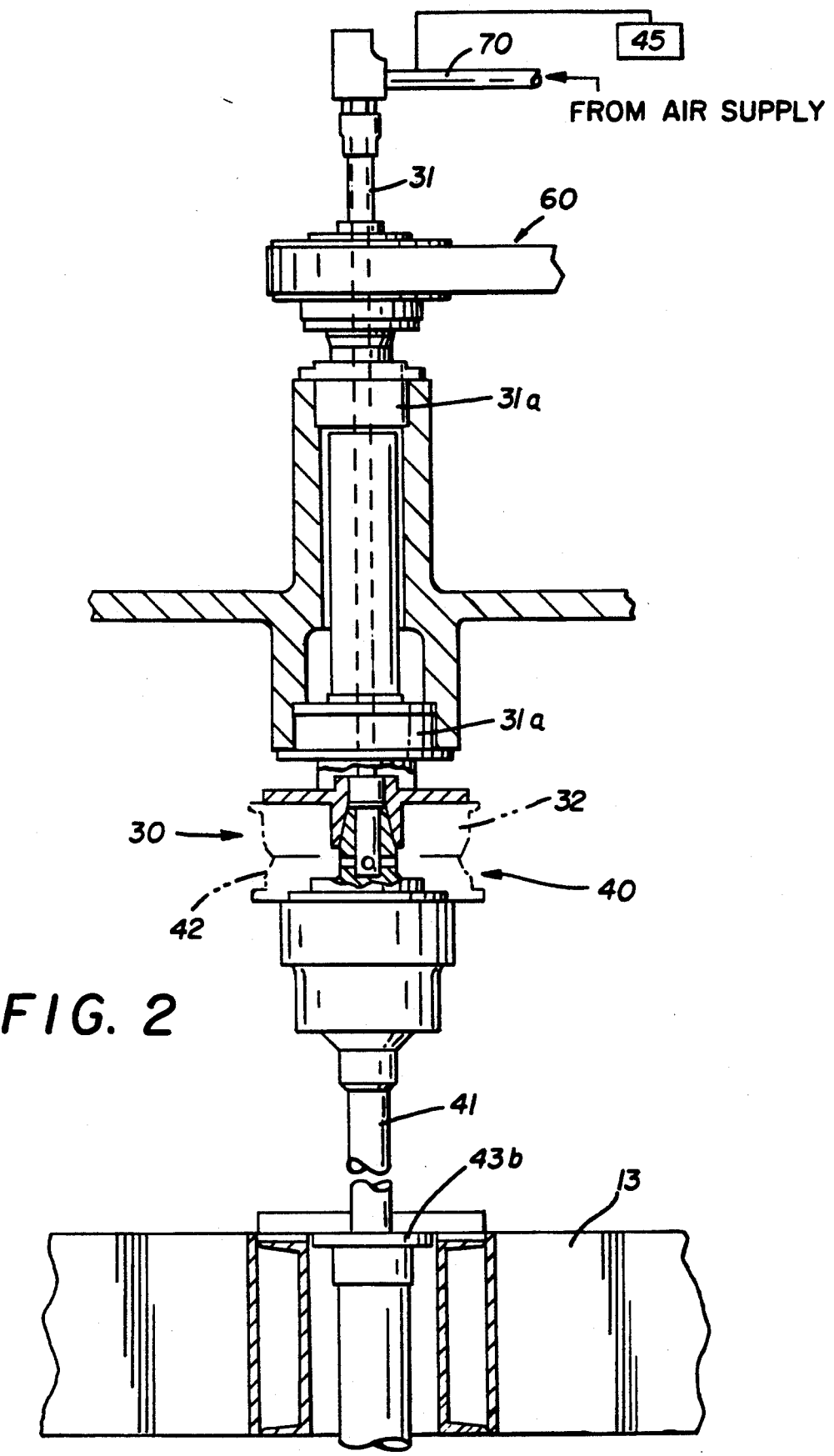
FIG. 2 is a sectional view taken along the line 2—2 of FIG. 1.

Referring to FIGS. 1 and 2, it will be seen that an upper chuck assembly 30 includes an upper chuck 32 mounted on a spindle 31 carried by the upper frame member 12, supported by bearings 31a, 31a and driven by a motor 61 through a drive pulley and timing belt arrangement generally indicated by the numeral 60. Again, the means for driving the upper spindle is well-known in the art and has not been described or illustrated in great detail herein.

As previously mentioned, a tire T is transported on the conveyor 21 to a lower chuck assembly generally indicated by the numeral 40. This assembly includes a lower chuck 42 mounted on a piston rod 41 which is attached to a hydraulic actuator generally indicated by the numeral 43 and which includes a cylinder 43a and piston 43b reciprocal so as to be capable of raising and lowering the lower chuck assembly 40 as is, again, well-known in the prior art. In FIG. 1 of the drawings, this is illustrated in the raised position with the tire T clamped in place between the upper and lower chuck assemblies 30 and 40.

Further describing the typical tire uniformity machine illustrated in FIG. 1, it will be seen that the loadwheel 50 is mounted for reciprocating movement in the direction of the arrow 53 into and out of engagement with the tire T being shown in engagement in FIG. 1 of the drawings. This loadwheel 50 is mounted on spindles 51, 51 for free rotation thereon. The spindles 51, 51 are carried on a carriage 52 which is driven in the direction of the arrow 53 by a reversible motor 54 through a gear box 54a and a chain drive and ball screw assembly 55. The means for reciprocating the loadwheel 50 into and out of engagement with the tire are also well-known in the art.

Completing the description of the tire uniformity machine illustrated in FIG. 1 of the drawings, it will be noted that an air supply line 70 is provided for attachment to an air supply source and is capable of injecting air through hollow upper main spindle 31 into the interior of the chucked tire T.

Before describing the regulator system in detail, it will be generally noted that, in testing tires on tire uniformity machines, the tire T is brought into the framework formed by the members 11, 12 and 13 on the conveyor 20. It will be assumed that the lower chuck assembly 40 is in the retracted position and one bead of tire T is then positioned on top of the lower chuck 42 of lower chuck assembly 40. Actuation of the hydraulic cylinder 42 raises the tire to the position of FIG. 1 and seats the opposed bead of the tire against upper chuck 32 and trapping the tire T between the chuck assemblies 30 and 40 in fluid tight relationship. The tire is then rotated by means of the motor 61 driving the spindle 31 and the upper chuck assembly 30 and the loadwheel 50 is moved into engagement, as illustrated in FIG. 1, following which the testing takes place. Following testing, the loadwheel 50 is retracted and rotation of the upper spindle 30 is stopped, whereupon the lower chuck assembly 40 is retracted, thereby depositing the tire T back on the conveyor 20 from which position it can be moved out of the framework and another tire inserted.

As previously noted, it is an object of this invention to control the inflation pressure of the tire T provided through line 70 during this testing operation. Accordingly, FIG. 3 of the drawings illustrates the system for achieving this.

Figure 3:
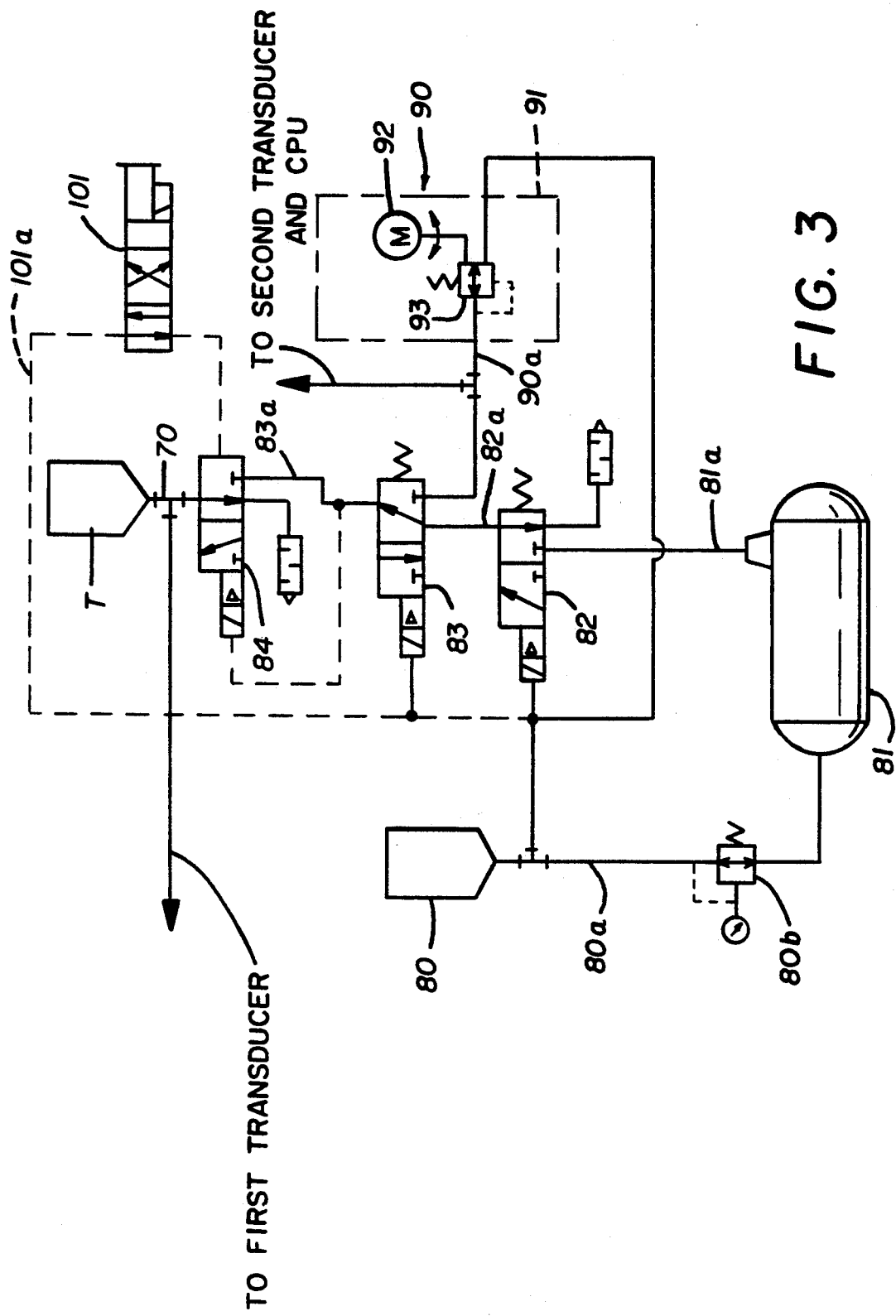
FIG. 3 is a schematic view of the tire pressure regulating system of the present invention.

Referring then to FIG. 3, it will be seen that a main air supply 80 and an air tank 81 are provided. These are connected by line 80a through the valve 80a. The air tank 81 is connected ultimately to the interior of the tire through line 81a and pilot or solenoid valve 82, line 82a and pilot or solenoid valve 83, and line 83a and pilot or solenoid valve 84.

A servo-controlled, mechanical precision regulator, generally indicated by the numeral 90, is also included and is in communication with the valve 83 through the line 90a. This regulator includes a housing 91, a reversing motor 92, and a spring-centered valve 93. This regulator is capable of being preset to the desired testing pressure.

A typical regulator which may be employed is the Bellofram Motorized Type 10 Pressure Regulator sold by The Bellofram Corporation of Burlington, Mass. and Newell, W. Va. This regulator is driven by two synchronous AC motors through a gear train and overload slip clutch. The motors are mounted in tandem and operate through a single output shaft. Each motor has a separate set of leads and the direction of rotation is determined by the leads to which power is applied.

If no electrical power is applied, this regulator maintains a constant predetermined output pressure. However, when power is applied to the motor, it turns the control capsule of the regulator and changes the output at a constant rate until power is removed.

During chucking or seating of the tire T, pressure is open from the tank 81 to the tire through the lines 81a, 82a and 83a. A first transducer 44 is provided which senses that the chucks 32 and 42 of chuck assemblies 30 and 40 have seated the beads of the tire T and have effectively closed. The first transducer then signals the regulator which opens the valves 83 and 84 and provides the predetermined testing pressure.

Should variations be sensed by a second transducer 45 mounted adjacent the tire, the variation is fed to the CPU which measures it against a predetermined test pressure and signals the regulator 90 as required. The regulator responds and increases or decreases output as required until the predetermined pressure is again reached.

A safety system is also provided and is generally indicated by the numeral 100 and includes a four-way, two-position valve 101. This system is open when the machine is powered up and is capable of dumping to the atmosphere on an emergency stop caused by an overload, etc. As can be seen, this safety feature is connected to the valves 82, 83 and 84 by the line 101a and will close those valves upon encountering an emergency situation.

It will be seen that, by the system just described, prompt and accurate responses can be obtained to variations in internal tire pressure without the need for manual adjustment or the use of the usual, somewhat imprecise electronic proportional regulation.

While a full and complete description of the invention has been set forth in accordance with the dictates of the Patent Statutes, it should be understood that modifications can be resorted to without departing from the spirit hereof or the scope of the appended claims.

Thus, while a specific, suitable regulator has been disclosed, it will be understood that other regulations having suitable operational characteristics may also be employed. For example, a regulator driven by a synchronous motor has been described, but an electrical stepper motor could also be utilized.

What is claimed is:

1. In a tire uniformity machine in which tires are inflated by air pressure for bead seating on opposed chucks for testing purposes, a control system comprising:
    a) a source of air under pressure in fluid communication with the tire;
    b) a servo-controlled mechanical regulator;
    c) at least one transducer positioned adjacent the chucks;
    d) said regulator being connected to said source of air and said at least one transducer;
    e) said at least one transducer being set to read chuck closing pressure and signal said regulator; and
    f) said regulator providing testing pressure to the tire upon receiving a chuck closing pressure signal from said at least one transducer.

2. The control system of claim 1 wherein a second transducer is disposed adjacent the tire and in communication with said controller.

3. A method of controlling tire inflation pressure in a tire uniformity machine in which a tire is seated between opposed chucks and tested under pressure, comprising the steps of:
a) presetting a servo-controlled mechanical regulator to a desired testing pressure;
b) providing a transducer adjacent the chucks;
c) reading the chuck closing pressure by the transducer and signalling the regulator; and
d) applying the preset testing pressure to the tire by controlling air from the main air supply source.

* * * * *